United States Patent [19]

Bogaty et al.

[11] 4,012,551

[45] Mar. 15, 1977

[54] COATED RAZOR BLADE

[75] Inventors: Herman Bogaty, Short Hills, N.J.;
Anthony John Peleckis, Trumbull, Conn.

[73] Assignee: Warner-Lambert Company, Morris Plains, N.J.

[22] Filed: Sept. 19, 1975

[21] Appl. No.: 615,012

Related U.S. Application Data

[63] Continuation of Ser. No. 439,795, Feb. 5, 1974, abandoned.

[52] U.S. Cl. ............................ 428/192; 30/346.53; 427/258; 427/284; 428/422; 428/463
[51] Int. Cl.² ..................... B32B 3/02; B32B 15/08
[58] Field of Search .......... 428/421, 422, 192, 463; 427/409, 258, 284; 30/346.53; 260/900

[56] References Cited

UNITED STATES PATENTS

| | | | |
|---|---|---|---|
| 2,754,223 | 7/1956 | Caroselli | 428/422 X |
| 2,976,257 | 3/1961 | Dawe et al. | 428/422 X |
| 3,019,206 | 1/1962 | Robb | 260/900 X |
| 3,224,094 | 12/1965 | Esemplare | 428/422 X |
| 3,283,117 | 11/1966 | Holmes et al. | 428/422 X |
| 3,498,826 | 3/1970 | Caroselli et al. | 428/422 X |
| 3,560,595 | 2/1971 | Phillips et al. | 260/900 X |
| 3,697,309 | 10/1972 | Werner | 427/409 X |

FOREIGN PATENTS OR APPLICATIONS

| | | | |
|---|---|---|---|
| 655,193 | 1/1963 | Canada | 428/422 |
| 1,050,244 | 12/1966 | United Kingdom | 428/422 |

*Primary Examiner*—Harry J. Gwinnell
*Attorney, Agent, or Firm*—Albert H. Graddis; Jeremiah J. Duggan

[57] ABSTRACT

The specific embodiments provide a razor blade comprising at least one cutting edge, and an adherent fluorocarbon polymer coating on the cutting edge. The coating has microscopic raised portions. There is also provided a method of treating a razor blade comprising depositing on the cutting edge of the blade a composition comprising a first fluorocarbon polymer and a second fluorocarbon polymer having a molecular weight greater than the first polymer. The deposited composition is heated at a temperature sufficient to cause the first polymer to melt and flow and insufficient to cause the second polymer to melt and flow. Alternatively, the molecular weights of the two polymers are chosen to be sufficiently different such that when the two polymers melt during a heating step the viscosity of the high molecular weight second polymer is sufficiently high to avoid or at least minimize flow.

14 Claims, No Drawings

COATED RAZOR BLADE

This is a continuation of application Ser. No. 439,795 filed Feb. 5, 1974, now abandoned.

BACKGROUND OF THE INVENTION

1. Field of the Invention

The present invention relates to safety razor blades and coatings for the cutting edges of such blades. More particularly, the present invention relates to cutting edge adherent fluorocarbon polymer coatings having improved shaving characteristics.

2. Description of the Prior Art

In addition to the usual problems involved in maintaining a sharp edge on razor blades during extended storage periods and through repeated use, razor blades used for shaving hair involve the problems of blade pull on the hairs, the effect of the blade action on the skin, as well as the overall ease with which such shaving can be accomplished. Blade comfort can be characterized as a function of lubricity and pull.

In order to lessen some of the undesirable effects which occur during the use of razor blades, various lubricants have been utilized. For example, blades have been coated with oil in order to use them in many applications. In addition, shaving preparations, such as shaving soaps and the like, have been employed to provide improved performance. Furthermore, blade edges have been made sharper for greater cutting ease and blades have been developed of metals which will hold a sharper edge for longer periods of time. Blades have also been made of metals which will resist attach by air and various liquids which cause the degradation of the blade.

Some coatings have been developed to provide blades with a degree of protection against air and liquids which attack them. For example, wax coatings have been applied to steel blades to prevent the blades from rusting due to the action of water. In addition, certain materials have been applied to blades in order to facilitate shaving with them. Such materials have included silicone coatings and halogenated hydrocarbon coatings.

Further, U.S. Pat. No. 3,071,856 discloses the use of polymers of tetrafluoroethylene as a coating for a razor blade cutting edge to reduce blade pull during shaving. U.S. Pat. No. 3,224,094 discloses an adherent blade cutting edge coating of a polyethylene resin having particles of polytetrafluoroethylene suspended therein for reducing blade pull.

SUMMARY OF THE INVENTION

In accordance with an aspect of the present invention, there is provided a razor blade comprising at least one cutting edge and an adherent fluorocarbon polymer coating on the cutting edge with the coating having microscopic raised portions.

In accordance with another aspect of the present invention, there is provided a method of treating a razor blade to provide a fluorocarbon polymer coating with microscopic raised portions on the cutting edge of the blade. The method comprises depositing on the cutting edge a composition comprising a first fluorocarbon polymer and a second fluorocarbon polymer having a molecular weight greater than that of the first polymer. The deposited composition is heated at a temperature sufficient to cause the first polymer to melt and flow and insufficient to cause the second polymer to melt and flow. Thus, the first polymer flows to become firmly adherent to the cutting edge substrate, and the second polymer having a higher molecular weight remains substantially in place by not flowing to form microscopic raised portions along the coating surface.

It is believed that the microscopic raised portions on the fluorocarbon polymer coating decreases blade pull by increasing the lubricity of the coating. Enhanced lubricity may be caused, at least in part, by intrapolymer particle shear that occurs in the raised portions when a shearing force is applied during shaving.

DESCRIPTION OF SPECIFIC EMBODIMENTS

The present invention can be practiced by providing a composite fluorocarbon polymer coating on a razor blade cutting edge by distributing a relatively high molecular weight fluorocarbon polymer in and/or on a relatively low molecular weight fluorocarbon polymer.

Suitable relatively high molecular weight polymers are fluorocarbon material including polymers of tetrafluoroethylene containing a chain of carbon atoms including a plurality of ($-CF_2-CF_2-$) groups. The polymers may vary widely in molecular weight in the form in which they are used for applying to the cutting edge, ranging from a molecular weight in the order of 50,000 to a molecular weight of the order of 10,000,000.

Suitable relatively low molecular weight polymers are fluorocarbon telomers containing a chain of carbon atoms including a preponderance of ($-CF_2-CF_2-$) groups, such as polymers of tetrafluoroethylene. These telomers have terminal groups at the ends of the carbon chains which may vary in nature, depending upon the method of making. Among the common terminal groups of such telomers are ($-H$), ($-COOH$), ($-Cl$), ($-CCl_3$), ($-CFClCF_2Cl$), ($-CH_2OH$) and ($-CH_3$). While the precise molecular weights and distribution of molecular weights of the telomers are not known with certainty, it is believed that they have molecular weights ranging from about 2,000 to about 50,000. Preferred chlorine containing telomers are those containing from about 0.15 percent to about 0.45 percent by weight of chlorine. U.S. Pat. Nos. 2,418,832 and 2,440,801 also describe suitable relatively low molecular weight fluorocarbon polymers.

The two fluorocarbon polymers should be chosen to have sufficiently different molecular weights such that the low molecular weight polymer melts and flows before the high molecular weight polymer can flow during a sintering step. Specifically, the molecular weights should be sufficiently different such that the sintering temperature can be chosen to cause the low molecular weight polymer to flow and provide a base coating distributed as a continuous film with the high molecular weight polymer distributed in a wide varying degree in and/or on the base film coating. As the high and low molecular weight polymers are sintered either independently or simultaneously, a commingling of the two polymers occurs to permanently anchor the high molecular weight polymer in the molten and flowing low molecular weight polymer.

When thus sintered, the high molecular weight polymer particles cause microscopic raised portions along the film surface because the sintering temperature is not sufficiently high to cause the high molecular weight polymer particles to melt and flow.

A low molecular weight telomer of tetrafluoroethylene sold by DuPont as Vydaz 1000 and having a molecular weight of approximately 25,000 was used with a high molecular weight polymer of tetrafluoroethylene also sold by DuPont as Teflon Product Type 30 to practice the present invention. The polymer of tetrafluoroethylene particles protruding a microscopic distance above the film surface appear to increase the lubricity of razor blade coating edges. This enhanced lubricity is believed to be at least partly a consequence of intra-polymer particle shear which occurs within the raised polymer particles when a shearing force is applied during a shaving stroke.

The raised polymer particles, or aggregates thereof, deposited by this method have been observed to be in the 10 to 30 micron size range. The appearance of the particles after sintering is crater-like with rims about 1 to 3 microns wide and 1 to 3 microns above the surface of the low molecular weight telomer. The particle microstructure appears to be an interlaced network of filamentry crystals, characteristic of polytetrafluoroethylene (PFTE). Within such particle rims, the bulk shear characteristic of the raised polymer prevails during an initial shaving period.

When the blades are coated with only a high molecular weight polymer such as DuPont's Teflon Product Type 30, or with a heavy coating of the high molecular weight polymer dispersed over a low molecular weight coating such as DuPont's Vydax 1000, the sintered high molecular weight coating has a cohesive film strength greater than the adhesive strength of the film to the substrate. As a result of this phenomenon the bulk coating, that material above 300 to 400 Angstroms, above the surface of the blade will shear the polymer above the blade surface and move back from the apex of the blade leaving only an initial monolayer adhered to the surface of the blade. It is desirable for improved lubricity to maintain the coating density and distribution of the sintered crater-like particles independent of each other so that a continuous chain or surface is avoided or at least minimized.

It should also be noted that the melting point of DuPont's Teflon Product Type 30 and DuPont's Vydax 1000 are approximately equal. However, the molecular weight of DuPont's Teflon Product Type 30 is so significantly higher than that of DuPont's Vydax 1000 that when the two polymers melt during the heating step the viscosity of the higher molecular weight of DuPont's Teflon Product Type 30 is sufficiently high to avoid or at least minimize flow of the Teflon Product Type 30.

It is contemplated that the high and low molecular weight polymers may be placed on a blade edge in discrete steps or may be mixed and placed on the blade edge in one step. However, it is preferred that a uniform adherent base coat of the low molecular weight polymer be provided along the apex of the cutting edge and rearwardly of the apex of the cutting edge for at least 0.001 inch.

When the two polymers are placed on the cutting edge in two discrete steps, the solids of the low molecular weight polymer can be applied to the cutting edge by dipping the edge in a dispersion of particles of fluorocarbon telomer in a voltatile liquid medium or by spraying, brushing, ultraviolet photopolymerization, RF sputtering, and electrophoresis of such a dispersion onto the edge and then evaporating the liquid medium. Among the volatile liquid media which may be used are water and such freons as dichlorodifluoromethane, dichlorotetrafluoroethane, trichlorotrifluoroethane, tertiarybutylalcohol, tetrachlorodifluoroethane or mixtures thereof. By using any of the above techniques, or any of the other known methods such as U.S. Pat. Nos. 3,071,856, 3,501,334, 3,518,110, 3,589,606 or 3,652,342, uniform continuous coating of the first polymer particles should be applied to the blade edge, including the apex and cutting facet of the razor blade.

Having applied the necessary base coating, the blade is then subsequently coated with solid high molecular weight polymer particles. This coating can likewise be accomplished via the methods as established above using the volatile liquid mediae also stated above. The desired process should be established to obtain a discrete distribution of high molecular weight particles.

As discussed above, the two polymers should be sintered or baked at an elevated temperature, for example, 300° F. to 800° F., for a sufficient period of time to permit the first or low molecular weight polymer to melt and flow and thereby become firmly affixed to the substrate while the second or high molecular weight polymer becomes molten and adherent to the substrate. Observation of the high molecular weight polymer after sintering indicates that the high molecular weight polymer tends to sag with little or no flow. However, the present invention contemplates the use of a high molecular weight polymer selected such that the polymer does not necessarily melt during sintering.

Sintering or baking time may vary from less than two minutes to three or more hours depending upon the particular fluorocarbon materials used, the nature of the substrate and the ability of the fluorocarbon particles to obtain the desired coating and coverage. The sintering process should be in a controlled atmosphere either inert, reducing, or vacuum. If the entire surface of the substrate is not prone to oxidation, sintering can be performed in an air atmosphere.

The following specific examples are illustrative of the nature of the present invention:

EXAMPLE 1

A dispersion of fluorocarbon telomer Vydax 1000 having a molecular weight of approximately 20,000 is diluted by mixing with trichlorotrifluoroethane to obtain a solids level of 7.5% by weight. Nine parts of this mixture is then subsequently diluted with 24 parts tertiarybutyalcohol and 5 parts tetrachlorodifluoroethane. The mixture is then placed in an air spray recirculating system pressure vessel using line pressure of 0.2 to 8 psi and a fluid heater to prevent freezing. The blades are sprayed using a gaseous atomizing pressure of 20–40 psi while the blades are transversed in front of the spraying guns at a rate of 3–25 feet per minute.

Having successfully applied the base telomer, the blades are preheated via a holding oven, induction heater, or infrared heater until the temperatures of the blades are stabilized between 140° and 200° F. As the blades attain this temperature, they are then processed through a second spray system containing a nonrecirculating but pressurized vessel containing a tank pressure of 1–10 psi and an atomizing pressure from 3–40 psi which is spraying a diluted mixture of polytetrafluoroethylene particles, containing one part DuPont's PTFE Product Type 30 with 50–70% solids by weight and 9 parts of deionized water while the blades transverse at a rate of about 3–25 feet per minute.

Having applied both coatings to the desired degree, the blade is placed in an atmosphere controlled furnace. The atmosphere used is inert nitrogen gas and the blade is raised in temperature to 665° F. as rapidly as possible above the sintering temperature of both materials, namely, 600° F. to 750° F., and held for a period of 8–15 minutes at that temperature followed by a subsequent rapid cooling cycle.

EXAMPLE 2

A dispersion of fluorocarbon telomer Vydax 1000 having a molecular weight of approximately 25,000 is diluted by mixing with trichlorotrifluoroethane to obtain a solids level of 7.5% by weight. Nine parts of this mixture is then subsequently diluted with 24 parts tertiarybutylalcohol and 5 parts tetrachlorodifluoroethane. The mixture is then placed in an air spray recirculating system pressure vessel using line pressure of 2 to 8 psi and a fluid heater to prevent freezing. The blades are sprayed using a gaseous atomizing pressure of 20–40 psi while the blades are transversed in front of the spraying guns at a rate of 3–25 feet per minute.

The blade is placed in an atmosphere controlled furnace. The atmosphere used is inert nitrogen gas and the blade is raised in temperature to 665° F. as rapidly as possible above the sintering temperature of both materials, namely, 600° F. to 750° F., and held for a period of 8–15 minutes at that temperature followed by a subsequent rapid cooling cycle.

Having successfully applied the base telomer, the blades are preheated via a holding oven, induction heater, or infrared heater until the temperatures of the blades are stabilized between 140° and 200° F. As the blades attain this temperature, they are then processed through a second spray system containing a nonrecirculating but pressurized vessel containing a tank pressure of 1–10 psi and an atomizing pressure from 3–40 psi which is spraying a diluted mixture of polytetrafluoroethylene particles, containing one part DuPont's PTFE Product Type 30 with 50–70% solids by weight and 9 parts of deionized water while the blades are transversing at a rate of about 3–25 feet per minute.

Having applied both coatings to the desired degree, the blade is again placed in an atmosphere controlled furnace. The atmosphere used is inert nitrogen gas and the blade is raised in temperature to 665° F. as rapidly as possible above the sintering temperature of both materials, namely, 600° F. to 750° F., and held for a period of 8–15 minutes at that temperature followed by a subsequent rapid cooling cycle.

EXAMPLE 3

A dispersion of the fluorocarbon telomer Vydax 1000 having a molecular weight of approximately 25,000 is mixed with tertiarybutylalcohol, tetrachlorodifluoroethane and trichlorotrifluoroethane to create a 0.01% to 0.1% by weight of the solid telomer. The dispersion is then placed in a vessel in which the blade edges can be immersed and a direct current power source attached to form a cell, having the blades as the cathode and the containing vessel or a separate submersion electrode as the anode. A voltage of 1 to 20 KV being applied to the system for a period of 3 to 20 minutes results in a thin uniform application of particles to the razor blade facets. The blades are then heated to volatilize the entrapped diluent.

The blades are then preheated via a holding oven, induction heater, or infrared heater until the temperatures of the blades are stabilized between 140° and 200° F. As the blades attain this temperature, they are then processed through a second spray system containing a non-recirculating but pressurized vessel containing a tank pressure of 1–10 psi and an atomizing pressure from 3–40 psi which is spraying a diluted mixture of polytetrafluoroethylene particles, containing one part DuPont's PTFE Product Type 30 with 50–70% solids by weight and 9 parts of deionized water while the blades are transversing at a rate of 3–25 feet per minute.

Having applied both coatings to the desired degree, the blade is placed in an atmosphere controlled furnace. The atmosphere used is inert nitrogen gas and the blade is raised in temperature to 665° F. as rapidly as possible above the sintering temperature of both materials, namely, 600° F. to 750° F., and held for a period of 8–15 minutes at that temperature followed by a subsequent rapid cooling cycle.

EXAMPLE 4

A combined dispersion of the PTFE polymer and telomer is obtained by using the organosol Teflon products and diluting the PTFE polymer and telomer in exact proportions with tertiarybutylalcohol and trichlorotrifluoroethane. A dispersion is formed consisting of 1% to 4% by weight Vydax particles, and 4% to 9% by weight Teflon particles. The dispersion as mixed is then placed in a pressurized vessel at 1–10 psi of a non-recirculating spray system which utilizes a fluid heater. The spray system using an atomizing pressure of 3–40 psi generates a fan spray pattern. The blade or blades are transversed in front of the spray gun at a speed of 5–20 feet per minute and the guns are adjusted to obtain the desired complete coverage with the Teflon/Vydax polymer particle coating the edge and cutting facets of the blade.

Having applied both coatings to the desired degree, the blade is placed in an atmosphere controlled furnace. The atmosphere used is inert nitrogen gas and the blade is raised in temperature to 665° F. as rapidly as possible above the sintering temperature of both materials, namely, 600° F. to 750° F., and held for a period of 8–15 minutes at that temperature followed by a subsequent rapid cooling cycle.

EXAMPLE 5

A dispersion of DuPont's fluorocarbon telomer Vydax 1000 having a molecular weight of approximately 20,000 is mixed with DuPont's Vydax AR having a molecular weight of 3,700 in equal proportions. Once mixed, the combination is diluted with trichlorotrifluoroethane to obtain a solids level of 0.3% by weight. The material is then homogenized in a Manton Gaulin homogenizer so that a viscosity of 10 centipoise has been achieved using a Brookfield Viscometer Model RVT with a No. 1 spindel using a speed of 20 RPM and temperature of 75° F. After the mixture has reached the proper viscosity it is placed into a spray booth utilizing a Nordson Pump Model 64, airless spray system and a Nordson Gun Model 153-150, and a nozzle No. 00-03-02. The incoming pump pressure is increased to 72 psig to obtain a nozzle pressure of 1600 psig. With these conditions the blades are transversed in front of the spraying nozzles at a rate of 3–25 feet per minute. The speed at which the blades are moved is adjusted to obtain the desirable uniformity and distribution of coating.

The blades are then processed through the subsequent operations of telomer sintering, Teflon spray and Teflon sintering as described in Example 1.

DuPont's Teflon Product Type 30 is believed to have a molecular weight of about 1,000,000, and a melting point of about 327° C. DuPont's Vydax 1000 is believed to have a molecular weight of about 20,000, and a melting point of about 320° C. Further, DuPont's Vydax AR is believed to have a molecular weight of about 3,500, and a melting point of about 290° C.

Although specific embodiments of the invention have been described herein, it is not intended to limit the invention solely thereto, but to include all the variations and modifications which suggest themselves to persons skilled in the art. For example, a suitable high molecular weight polymer can be copolymers of tetrafluoroethylene such as those with a minor proportion, e.g., up to 5% by weight, of hexafluoropropylene.

What is claimed is:

1. A razor blade comprising at least one cutting edge, a first adherent continuous polytetrafluoroethylene coating on the cutting edge having a relatively low molecular weight between approximately 2,000 and 50,000, and a second adherent continuous polytetrafluoroethylene coating on said first coating comprising discrete particles of said second polytetrafluoroethylene coating having a relatively high molecular weight between approximately 50,000 and 10,000,000 sintered over said first coating to form microscopic raised portions of said second coating on said first coating along said cutting edge.

2. The blade of claim 1, wherein said raised portions are provided on less than about 60 percent of the surface area of said first polymer coating.

3. The blade of claim 1 wherein said raised portions extend upwardly not greater than about 7 microns from said cutting edge.

4. The blade of claim 1 wherein said raised portions extend upwardly from about 1 to 3 microns from said cutting edge.

5. The blade of claim 1 wherein said raised portions are circular formations, each one of said formations having an outer diameter of about 10 to about 30 microns.

6. The blade of claim 1 wherein said raised portions are annular formations.

7. The blade of claim 6 wherein each one of said annular formations has an outer diameter of about 10 to about 30 microns.

8. The blade of claim 7 wherein the difference between the inner diameter and the outer diameter of each one of said annular formations is about 1 to about 3 microns.

9. The blade of claim 8 wherein each one of said annular formations extends upwardly from about 1 to about 3 microns.

10. The blade of claim 5 wherein about 300 to about 1,000 of said formations are provided per 0.001 square inch of said cutting edge.

11. The blade of claim 5 wherein less than 2,000 of said formations are provided per 0.001 square inch of said cutting edge.

12. The blade of claim 1 wherein said second polytetrafluoroethylene has molecular weight of about 1,000,000.

13. The blade of claim 1 wherein said first polytetrafluoroethylene includes a terminal group selected from the terminal groups consisting of (—H), (—COOH), (—Cl), (—CCl$_3$), (—CFClCF$_2$Cl), (—CH$_2$OH) and (—CH$_3$).

14. The blade of claim 1 wherein said first polytetrafluoroethylene includes chlorine containing terminal groups, said chlorine being present in an amount of about 0.15 percent to about 0.45 percent by weight of said first polytetrafluoroethylene.

* * * * *